: 2,864,665
Patented Dec. 16, 1958

2,864,665

REDUCTION OF PLUTONIUM TO PU+3 BY SODIUM DITHIONITE IN POTASSIUM CARBONATE

Daniel R. Miller, Ithaca, N. Y., and Henry R. Hoekstra, Chicago Heights, Ill., assignors to the United States of America as represented by the United States Atomic Energy Commission No Drawing. Application June 22, 1949
Serial No. 100,742

7 Claims. (Cl. 23—14.5)

This invention is concerned with chemical methods of treating plutonium, and a particular modification of the present invention relates to oxidation-reduction methods of separating plutonium from contaminating elements.

Reference herein to "plutonium values" is to be understood as denoting the element generically whether in its free state or in the form of a compound. Plutonium has at least four valence states when it is contained as a constituent of a compound or in the ionic state in solution. These states are the +3, +4, +5, and +6 states. The +3, +4, and +6 states are the valence states normally encountered in aqueous solutions of plutonium compounds. In this specification, the term "higher valence states" will be understood as referring to the +4, +5, and +6 valence states of plutonium. Similarly, the term "lower valence state" will be understood as referring to the trivalent state of plutonium.

Plutonium may be reduced from its higher valence states to the lower valence state with comparative ease when the plutonium reduction is carried out in an acid medium. The reduction of the higher valence states of plutonium to the lower valence state, however, is much more difficult when the plutonium is contained in an alkaline medium. One reason for the greater difficulty in reducing plutonium compounds in alkaline medium is the much higher reduction potential required of the reducing agent. This is illustrated by the following potential schemes showing reduction potentials both in an acid and in an alkaline medium.

In 1 M OH⁻ solution:

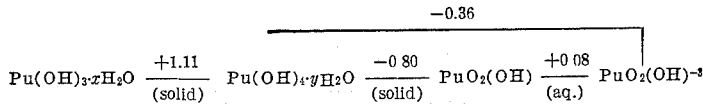

In 1 M HNO₃ solution:

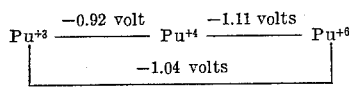

Because of the more positive reduction potential required, most reducing agents which are suitable for reducing plutonium compounds in an acidic medium are unsuitable for use in an alkaline medium. Other difficulties encountered in reducing higher-valence-plutonium values to the lower-valence state in an alkaline medium include the formation of insoluble plutonium hydroxides in an alkaline medium, the complexing effect of the reducing agent or reduction products, and the slowness of the reaction. Because of these difficulties most of the common reducing agents have proved unsuccessful in a reduction of plutonium values in an alkaline medium or have been found to be otherwise unsatisfactory.

An object of the present invention is to provide a method for reducing plutonium from a higher to a lower valence state.

An additional object is to provide a method for reducing plutonium from a higher to a lower valence state where the plutonium is contained as a plutonium compound in an alkaline medium.

A further object is to provide an improved method for metathesizing a lanthanum fluoride plutonium-containing precipitate.

Other objects and advantages of the present invention will become apparent from the following detailed description.

We have discovered that higher-valence-plutonium values may be reduced to the lower valence state by treatment of said values with the dithionite ion, $S_2O_4^{--}$. Plutonium values may readily be reduced by the use of this ion in an aqueous medium under acid, alkaline, or neutral conditions. The process of this invention has been found particularly advantageous in the reduction of higher valence plutonium values to the lower valence state under alkaline conditions.

The $S_2O_4^{--}$ ion which is known by the IUC-preferred name of dithionite ion, and also by the older names hydrosulfite or hyposulfite ion, has a reduction potential, both in acid and alkaline mediums, which is sufficiently positive to readily reduce higher-valent plutonium values in acid and alkaline mediums. The potentials in acid and base for the half-cell reaction of dithionite ion are:

$$2H_2O + HS_2O_4^- = 2H_2SO_3 + H^+ + 2e^-, E^0 = 0.23$$

$$4OH^- + S_2O_4^{--} = 2SO_3^{--} + 2H_2O + 2e^-, E_B^0 = 1.4$$

The amount of dithionite ion required to effect the reduction of the higher-valence plutonium values may be calculated from the above equations. Stoichiometric amounts of dithionite ion may be used, but it is usually desirable to introduce a considerable excess of dithionite ion in order to increase the speed of the reaction and insure completeness thereof. The dithionite ion may be introduced into the aqueous medium in which the reduction reaction is to be carried out by means of any soluble dithionite compound. The alkali metal dithionites are suitable, and on a cost basis $Na_2S_2O_4$ is particularly desirable. The reduction may be carried out at room temperatures, but the reduction is much accelerated at higher temperatures; so it is often found desirable to digest the reduction mixture at temperatures of, for example, between 40° and 90° C. in order to increase the speed of the reaction. The dithionite ion, while quite stable over reasonable periods in aqueous medium, does tend to decompose over longer periods of, for example, twenty-four hours, particularly in acid solutions. It is therefore desirable to use freshly prepared dithionite solutions to carry out the reduction reaction.

One embodiment of our invention is concerned with the employment of the process of this invention in the metathesis step of plutonium separation processes. Plutonium, as it is normally produced, is contaminated with quantities of fission products and uranium. There are numerous processes for separating plutonium from these fission products and from uranium, and important among these processes are the precipitation processes wherein plutonium is carried with a lanthanum fluoride carrier precipitate. The plutonium is normally present in the lanthanum fluoride precipitate in the tetravalent state, but small quantities of the plutonium may be present in either the tri- or hexavalent state. The lanthanum fluoride plutonium-containing precipitate is quite difficult to dissolve by ordinary methods, so the usual procedure is to metathesize the lanthanum fluoride carrier precipitate in a solution containing a hydroxide. This hydroxide solution is formed either by introducing a soluble hydroxide into an aqueous medium or by introducing a soluble carbonate which will hydrolyze to furnish the required hydroxide concentration. The concentration of the hydroxide ion in the solution may vary between fairly wide limits; however, where this solution is prepared with potassium hydroxide, it is usually a solution having a concentration between 10% and 20% KOH, corresponding approximately to a 2 to 4 N hydroxide solution. As previously mentioned, the tri-, tetra-, and hexavalent plutonium hydroxides are insoluble. The solubilities of these compounds vary, however, with the hexavalent plutonium hydroxide being the most soluble and the trivalent plutonium hydroxide being the least soluble. In order to obtain the maximum yield of plutonium through the metathesis step of the plutonium separation process, it is therefore highly desirable that the plutonium be present in the hydroxide slurry in the trivalent state.

We have found that, if the metathesis reaction is carried out in an aqueous medium containing dithionite ion, substantially all of the plutonium present will be maintained in the trivalent state throughout the reaction and the maximum plutonium yield will be obtained. No important modifications need be made in the usual method of metathesizing lanthanum fluoride carrier precipitates to incorporate the process of this invention. The usual lanthanum fluoride methathesis step is shown in the co-pending application of Robert E. Duffield, Serial No. 737,723, filed March 27, 1947. By the process of the present invention, a soluble source of dithionite ion is introduced into the hydroxide solution either during or preferably before the introduction of the lanthanum fluoride precipitate which is to be metathesized. Any soluble dithionite compound may be used provided its cation is not undesirable in the process of plutonium separation. It has been found that with most processes, sodium dithionite is a most suitable dithionite compound. As has been mentioned before, the concentration of the dithionite ion in the solution should be at least stoichiometrically equal to the concentration of the higher-valence plutonium ions. It is desirable, however, in order to obtain maximum yield, that a considerable excess of dithionite ion be present. The lanthanum fluoride methathesis step usually includes a short period of digestion at about 75° C. This is about the optimum temperature for dithionite plutonium reduction so that the introduction of the dithionite ion does not require any modification of the normal lanthanum fluoride metathesis step in this respect.

Now that we have discussed the broad aspects of this invention, it may be further illustrated by the following specific examples.

Example I

A tetravalent-plutonium hydroxide slurry in potassium carbonate solution was prepared wherein the plutonium was present in a concentration of 1.3 mg./ml. The potassium carbonate concentration was 2 M. Three cubic centimeters of this slurry was then introduced into a 1-cm. cell of a Beckman quartz spectrophotometer. The slurry was then made 0.2 M in sodium dithionite. The reduction was followed by the spectrophotometer, and it was found that reduction was slow at room temperatures but that warming to 75° C. for several minutes brought about complete reduction. The Pu(III) curve, except for minor differences, corresponds closely to the Pu(III) curve in acid solution.

The use of the process of this invention as applied to a method for metathesizing an insoluble lanthanum fluoride plutonium carrier to a soluble lanthanum compound in a process for separating plutonium from fission products and uranium may be illustrated with the following example.

Example II

Twenty-eight cubic centimeters of $LaF_3$ slurry containing 0.1 g. of lanthanum and $3.62 \times 10^{-4}$ g. of plutonium was made 10% in KOH by the addition of solid KOH. Sodium dithionite was then added in sufficient quantity to make the slurry 0.2 M in dithionite ion. This solution was agitated for sixty minutes at 75° C. and then centrifuged. After centrifuging, the supernatant liquid was decanted off and the lanthanum hydroxide was washed four times with 1.12 cc. $H_2O$ with fifteen minutes agitation at room temperature for each washing. The lanthanum hydroxide was then dissolved in 1.12 cc. of 60% $HNO_3$. This solution was analyzed for plutonium carried and it was found that 98.8% of the plutonium had carried and was dissolved in the $HNO_3$ solution.

While there have been described certain embodiments of this invention, it is to be understood that it is capable of many modifications. Although it is particularly useful as a modification of the lanthanum fluoride plutonium separation process, the process of this invention may be used in analytical work involving plutonium, in the refining of plutonium, and in any process where it is desired to reduce plutonium from a higher to a lower valence state. Changes, therefore, may be made without departing from the spirit and scope of the invention as described in the appended claims. It is the intention to claim all novelty of invention as broadly as possible in view of the prior art.

What is claimed is:

1. The method of reducing plutonium values from a higher valence state to the trivalent state, which comprises adding to said plutonium values contained in an aqueous alkaline medium dithionite ion.

2. The method of reducing plutonium values from a higher valence state to the trivalent state, which comprises adding to said plutonium values contained in an aqueous alkaline medium an alkali metal dithionite.

3. In a process for separating plutonium from contaminants normally occurring therewith, the step which comprises adding to high-valence plutonium values contained in an aqueous alkaline slurry a soluble dithionite salt whereby the plutonium values are reduced to the trivalent state.

4. In a process for separating plutonium values from contaminants normally associated therewith wherein a lanthanum fluoride carrier precipitate containing plutonium is metathesized with a hydroxide-containing solution, the step which comprises adding to said precipitate in an aqueous alkaline medium a soluble dithionite.

5. The process of claim 4 wherein the dithionite is sodium dithionite.

6. The process of claim 4 wherein the dithionite is potassium dithionite.

7. In a process for separating plutonium from fission products and uranium wherein a lanthanum floride carrier precipitate containing plutonium is metathesized with hydroxide ion, the step which comprises metathesizing the lanthanum fluoride carrier precipitate in the presence of about 0.2 M sodium dithionite at a temperature between 40° and 90° C.

References Cited in the file of this patent

UNITED STATES PATENTS 2,767,044    Hill et al. _____ Oct. 16, 1956

OTHER REFERENCES

Mellor: Comprehensive Treatise of Inorganic and Theoretical Chemistry, vol. 10, p. 171 (1930), publ. by Longmans, Green & Co., London.

Harvey et al.: The Chemistry of Plutonium, Journal of the Chemical Society, August 1947, pp. 1010, 1011.